June 9, 1925.
W. S. GREGORY
ANIMAL TRAP
Original Filed Oct. 31, 1921
1,541,639
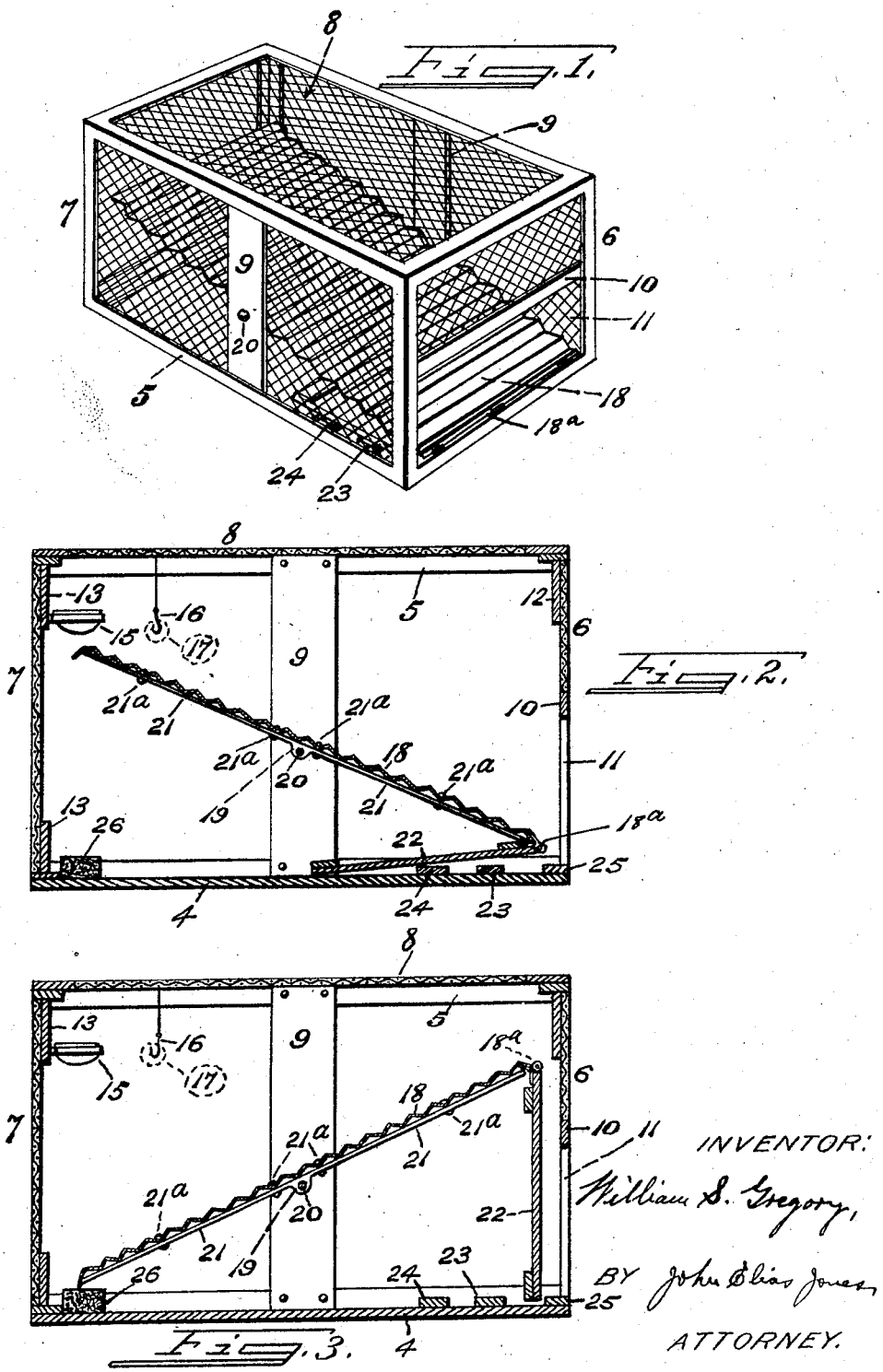

Patented June 9, 1925.

1,541,639

UNITED STATES PATENT OFFICE.

WILLIAM S. GREGORY, OF CINCINNATI, OHIO.

ANIMAL TRAP.

Application filed October 31, 1921, Serial No. 511,924. Renewed April 18, 1925.

*To all whom it may concern:*

Be it known that I, WILLIAM S. GREGORY, a citizen of the United States of America, and a resident of Cincinnati, in the county of Hamilton and State of Ohio, have invented a certain new and useful Improvement in Animal Traps, of which the following is a specification.

This invention relates to animal-traps adapted for use on what may be termed a humane order, wherein the animal is caught and sustained in the trap without injury or suffering, excepting that of being deprived of its liberty, and the essential features of the invention will be fully hereinafter described and particularly pointed out in the claim that follows.

In the accompanying sheet of drawings—

Figure 1 is a perspective view showing the device in its preferred form, but omitting in the view some of the internal parts that would only otherwise serve to obscure the essential ones of the trap if they were attempted to be disclosed through the meshes of the wire-screened walls thereof; Fig. 2, a central longitudinal section of the device shown in Fig. 1, but with the screen-wire of the further side-wall omitted (for clearness); Fig. 3, a view similar to Fig. 2, but showing the ensnaring-part thereof in action, or in the position it assumes when the animal has been caught and held captive therein.

Bodily or generally speaking, the device is in the form of a rectangular box-like structure, having or combining a solid wooden bottom 4, vertical side-walls 5, 5, opposite end-walls 6 and 7, and a top 8. All said walls and top are preferably made up of screen-wire set in suitable frames, to provide for the desired light and ventilation, and the said side-walls have at their centers the upright, broad strips or posts 9, 9. The fore end-wall 6 is screened but half-way down from its upper edge, a middle, horizontal, stiffening-bar 10 being used to divide that end-wall 6 so as to leave an opening or entrance 11 beneath the said bar 10 for the animal to enter, as well as to be later removed or released.

Transverse re-inforcing strips 12, 13 are provided at the opposite ends of the receptacle formed by the box-like structure, aforesaid, a drinking vessel or cup 15 being supported from the upper re-inforcing strip 13, about the center thereof, to provide for the more direct course of the animal in entering the trap, and a suspension-hook 16 being provided a little to one side the center of the rear portion of the top or screened roof 8 of the trap for the attachment of the bait 17, (the latter being shown in dotted lines only).

A tilting-platform 18 is longitudinally-disposed in the receptacle and is preferably made of crimped sheet-metal, and several eye-blocks 19 are riveted to the bottom-face of the platform, a suitable distance apart, for the engagement of a transverse-bolt forming a rock-shaft 20 that is journaled at its opposite ends in the upright side-posts 9, 9, of the structure.

The opposite ends of the eye-blocks 19 have elongated bars 21, 21 that are extended along the bottom of the platform, from end to end, and are adapted to stiffen same against sagging, and said elongated bars 21, 21 are both duly riveted in place at 21$^a$ to some of the crimped formations thereof.

The crimping of the metal forming the platform serves to provide a good foot-hold for the animal in walking on the sloped platform into the trap and to inspire its confidence in advancing upwardly toward the bait and water when it might otherwise slip backwardly if the platform were made of plane-faced metal or wood, and, besides, all the parts thus far described are by far preferably made of galvanized or painted metal that will not corrode or rust, or be subject to gnawing to pieces or in holes by the captured or imprisoned animal, in an effort to effect or result in its escape.

The crimps of the platform are preferably of V-shape cross-section, as shown in both views 2 and 3, although they may be of curvilinear corrugations, to provide for the ready and firm planting of the animal's feet on the platform against slipping backward and for its easy advancement as before noted, and in encouraging it in every way to go after and secure the bait in the remote rear upper part of the trap.

The tilting-platform 18 has hinged to its outer or fore end 18$^a$ a closure or lock door 22 that is adapted to fold or turn thereunder when the trap is in its normal state, as best seen in Fig. 2. The said lock-door automatically drops into filler or closure position in the entrance 11 when the platform has been tilted at its inner end by the weight and pressure of the fore end of the animal that has fully entered thereon so that the platform cannot then be tilted or lowered at its said outer end to let the now imprisoned or caught animal retreat or escape through the entrance 11, which latter is the only means of ingress or egress into and from the trap. Said door 22 gravitates or drops into perpendicular position in the said entrance or door-way 11, which action causes a safe and strong bracing of the outer end of the platform in its upper or raised position so that it cannot be lowered by the animal while it is in the trap, and thus forms a lock-gate or filler-door until it is desired to release the animal which is effected by simply raising the outer end of the platform sufficient for the lower edge of the said lock-gate to clear the bottom of the trap and all detents (hereinafter referred to) thereon, at which instant or moment the said lock-gate is backed or retreated into the trap to fold beneath the platform 18 and rest on the bottom 4, as in Fig. 2, whereby the said outer end of the platform may be tilted or lowered into normal position and thus permitting the withdrawal of the animal backwardly from its place on the platform through the said entrance-opening 11.

While caught in the trap, with its fore-part resting on the inner half of the platform 18, the animal can ordinarily reach up and get the food and drink supply located in the rear upper part of the trap so that it will not suffer for want thereof while awaiting release at the proper convenience or pleasure of the trapper.

In order to make the bracing or locking position of the closure-door 22 doubly sure against any inward movement or pressure by another animal outside that might be prowling about and trying to get into the trap through curiosity, hunger, or sympathy for the already imprisoned animal that might be its mate, I provide an auxiliary pair of spaced, parallel cross bars or detent-cleats 23 and 24 a short distance back of the sill-cleat 25. These auxiliary detent-cleats prevent the accidental or undue swinging in either direction, inwardly or outwardly, of the said drop-door 22 away from its effective locking-position, the weight of the outer part of the platform and that of the rear part of the animal instantly and automatically causing the lower free end of the drop-door to engage one or the other of said auxiliary detent-cleats, depending upon the direction and extent of hinging-movement of the drop-door.

It will be seen that it would take quite a drop of the raised outer end of the platform 18 to bring the lower end of the drop-door 22 into engagement with the second one 24 of the two inner cleats, but it would not even then be sufficient to allow the animal to escape, as the said outer end of the platform would still remain propped up by the still pendent but slightly tilted drop-door 22, although not exactly perpendicular.

As the animal cannot when trapped, reach the drop-door 22 nor the bottom-member 4 of the trap, it would be unnecessary to make them of metal to offset the animal gnawing through them.

Instead of but a single compartment, as shown, the trap might be made with a number of them on the same principle and capable of the same effect, with the advantage of catching many animals instead of only one at the same setting.

A rubber pad or felt strip 26 is placed on the floor of the trap, at the inner end of the receptacle, to receive and cushion the inner end of the platform 18 when the animal is in the act of being caught. This pad also thus prevents any chance of the drop-door 22 not catching in lock-position by rebounding action.

In closing it might be said that the drop-door 22 and the pair of inner cross-bars or detent-cleats 23 and 24 are like unto the ordinary form of gravitating-pawl and ratchet-detent device in general use for many purposes and aptly fit in in connection with the temporary locking or propping of the tilting-platform 18 in the entrance-opening 11 of the trap to prevent the escape or unintended liberation of the ensnared animal.

I claim:—

In an animal-trap, the combination of a receptacle having a fore opening or entrance, a platform or false bottom pivotally mounted within the receptacle longitudinally-back of the said entrance, a drop door or gate hinged along its outer edge to the outer end of the said platform but so as to fold beneath the latter when in normal position awaiting the entrance of the animal to be caught or entrapped, and adapted to automatically swing backwardly into said entrance when the animal has fully entered and with its fore part resting on and lowering the inner end of said platform and simultaneously raising or elevating the said outer end of said platform thereby, whereby the locking of said tilted platform is instantly effected on said full entrance of the animal, suitable cross-braces on the bottom of the receptacle to obstruct and prevent the accidental retreat of the lower free end of said drop-door away from platform locking position, means for tempting and sustaining the animal in the trap and means for cushioning the fall of the inner end of the platform when the animal has entered the trap, substantially as herein shown and described.

WILLIAM S. GREGORY.